US010795387B2

(12) United States Patent
Kuei et al.

(10) Patent No.: US 10,795,387 B2
(45) Date of Patent: Oct. 6, 2020

(54) WATER TEMPERATURE CONTROL SYSTEM AND WATER TEMPERATURE CONTROL METHOD

(71) Applicants: Tso-I Kuei, Taipei (TW); Li-Chuan Wang, Taipei (TW)

(72) Inventors: Tso-I Kuei, Taipei (TW); Li-Chuan Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 65 days.

(21) Appl. No.: 16/262,956

(22) Filed: Jan. 31, 2019

(65) Prior Publication Data

US 2019/0250652 A1    Aug. 15, 2019

Related U.S. Application Data

(60) Provisional application No. 62/629,634, filed on Feb. 12, 2018.

(51) Int. Cl.
G05D 23/13    (2006.01)

(52) U.S. Cl.
CPC ....... *G05D 23/1393* (2013.01); *G05D 23/134* (2013.01); *G05D 23/1353* (2013.01)

(58) Field of Classification Search
CPC ............. G05D 23/134; G05D 23/1353; G05D 23/1393

(Continued)

(56) References Cited

U.S. PATENT DOCUMENTS 5,050,062 A * 9/1991 Hass ................... G05D 23/1393
137/624.12
RE37,888 E * 10/2002 Cretu-Petra ............. E03C 1/057
236/12.12

(Continued)

FOREIGN PATENT DOCUMENTS

CN            2452048       10/2001
CN          202418732        9/2012

(Continued)

OTHER PUBLICATIONS

"Office Action of China Counterpart Application", dated Apr. 21, 2020, p1-p12.

*Primary Examiner* — Marc E Norman
(74) *Attorney, Agent, or Firm* — JCIPRNET

(57) ABSTRACT

A water temperature control system and a water temperature control method are provided. The water temperature control system includes a thermostatic spool, a temperature sensor, a controller, and a stepper motor. The thermostatic spool is configured to mix water at a first temperature and water at a second temperature to produce output water. The temperature sensor is configured to sense a current water temperature of the output water based on a sensing frequency to provide a current water temperature signal. The controller is configured to provide a step number control signal according to a target water temperature signal and a current water temperature signal. Based on a step frequency greater than the sensing frequency, the stepper motor is configured to provide a step number according to a step number control signal to adjust a flow rate of the water at the first temperature and a flow rate of the water at the second temperature.

10 Claims, 3 Drawing Sheets

(58) Field of Classification Search
USPC .................................................. 236/12.12
See application file for complete search history.

(56) References Cited

U.S. PATENT DOCUMENTS

| | | | | |
|---|---|---|---|---|
| 2002/0153425 | A1* | 10/2002 | Mountford | G05D 23/1393 |
| | | | | 236/12.12 |
| 2008/0112843 | A1* | 5/2008 | Peel | G05D 23/1393 |
| | | | | 422/2 |
| 2014/0069516 | A1* | 3/2014 | Shapira | E03C 1/055 |
| | | | | 137/88 |

FOREIGN PATENT DOCUMENTS

| | | |
|---|---|---|
| CN | 105466027 | 4/2016 |
| TW | M366003 | 10/2009 |
| TW | M409386 | 8/2011 |

* cited by examiner

WATER TEMPERATURE CONTROL SYSTEM AND WATER TEMPERATURE CONTROL METHOD

CROSS-REFERENCE TO RELATED APPLICATION

This application claims the priority benefit of U.S. provisional application Ser. No. 62/629,634, filed on Feb. 12, 2018. The entirety of the above-mentioned patent application is hereby incorporated by reference herein and made a part of this specification.

BACKGROUND

Technical Field

The invention relates to a temperature control system and a temperature control method and more particularly relates to a water temperature control system and a water temperature control method.

Description of Related Art

According to existing water temperature control methods, a flow rate of cold water and a flow rate of hot water are adjusted in most cases, and output water at a water temperature desired by users is produced based on a ratio of the flow rate of the cold water to the flow rate of the hot water. At present, a water discharge capacity of a motor is often controlled by water pressure, so as to reach the desired temperature of the users. How to quickly and instantly reach the water temperature desired by the users is one of the main lessons for improving the water temperature control method.

SUMMARY

The invention provides a novel water temperature control system and a water temperature control method, whereby a water temperature desired by users can be reached quickly and instantly.

The water temperature control system of the invention includes a thermostatic spool, a temperature sensor, a controller, and a stepper motor. The thermostatic spool has a first water inlet, a second water inlet, and a water outlet. The thermostatic spool is configured to receive water at a first temperature through the first water inlet, receive water at a second temperature through the second water inlet, mix the water at the first temperature and the water at the second temperature to produce output water, and provide the output water through the water outlet. The temperature sensor is disposed at the thermostatic spool. The temperature sensor is configured to sense a current water temperature of the output water based on a sensing frequency, so as to provide a current water temperature signal. The controller is coupled to the temperature sensor. The controller is configured to receive a target water temperature signal and receive the current water temperature signal and provide a step number control signal according to the target water temperature signal and the current water temperature signal. The stepper motor is disposed at the thermostatic spool and coupled to the controller. Based on a step frequency, the stepper motor is configured to provide a step number according to a step number control signal, so as to adjust a flow rate of the water at the first temperature and a flow rate of the water at the second temperature. The step frequency is greater than the sensing frequency.

The water temperature control method of the invention is adapted to a water temperature control system. The water temperature control system includes a thermostatic spool and a stepper motor. The stepper motor is disposed at the thermostatic spool. The water temperature control method includes steps of: receiving water at a first temperature and water at a second temperature through the thermostatic spool and mixing the water at the first temperature and the water at the second temperature to produce output water; sensing a current water temperature of the output water based on a sensing frequency to provide a current water temperature signal; receiving a target water temperature signal and receiving the current water temperature signal and providing a step number control signal according to the target water temperature signal and the current water temperature signal; providing a step number corresponding to the step number control signal by the stepper motor based on a step frequency and according to the step number control signal, so as to adjust a flow rate of the water at the first temperature and a flow rate of the water at the second temperature. The step frequency is greater than the sensing frequency.

In view of the above, according to the invention, the current water temperature of the output water is sensed based on the sensing frequency to provide the current water temperature signal, and the step number control signal is provided according to the target water temperature signal and the current water temperature signal. Next, in the invention, the step number corresponding to the step number control signal is provided by the stepper motor based on the step frequency and according to the step number control signal, so as to adjust the flow rate of the water at the first temperature and the flow rate of the water at the second temperature. The step frequency is greater than the sensing frequency. As such, the thermostatic spool can quickly and instantly reach the water temperature desired by the users according to the flow rate of the water at the first temperature and the flow rate of the water at the second temperature associated with the step number.

To make the above features and advantages of the invention more comprehensible, several embodiments accompanied with drawings are described in detail as follows.

DESCRIPTION OF THE EMBODIMENTS

The elements provided in the present invention will be elaborated in the following description with reference to the accompanying drawings, and the reference numbers appearing in different figures are deemed as indicating the same or similar elements. These embodiments are only a part of the invention and are not all of the feasible embodiments of the invention. More particularly, these embodiments are merely examples of devices and methods within the scope of the invention.

Figure 1:
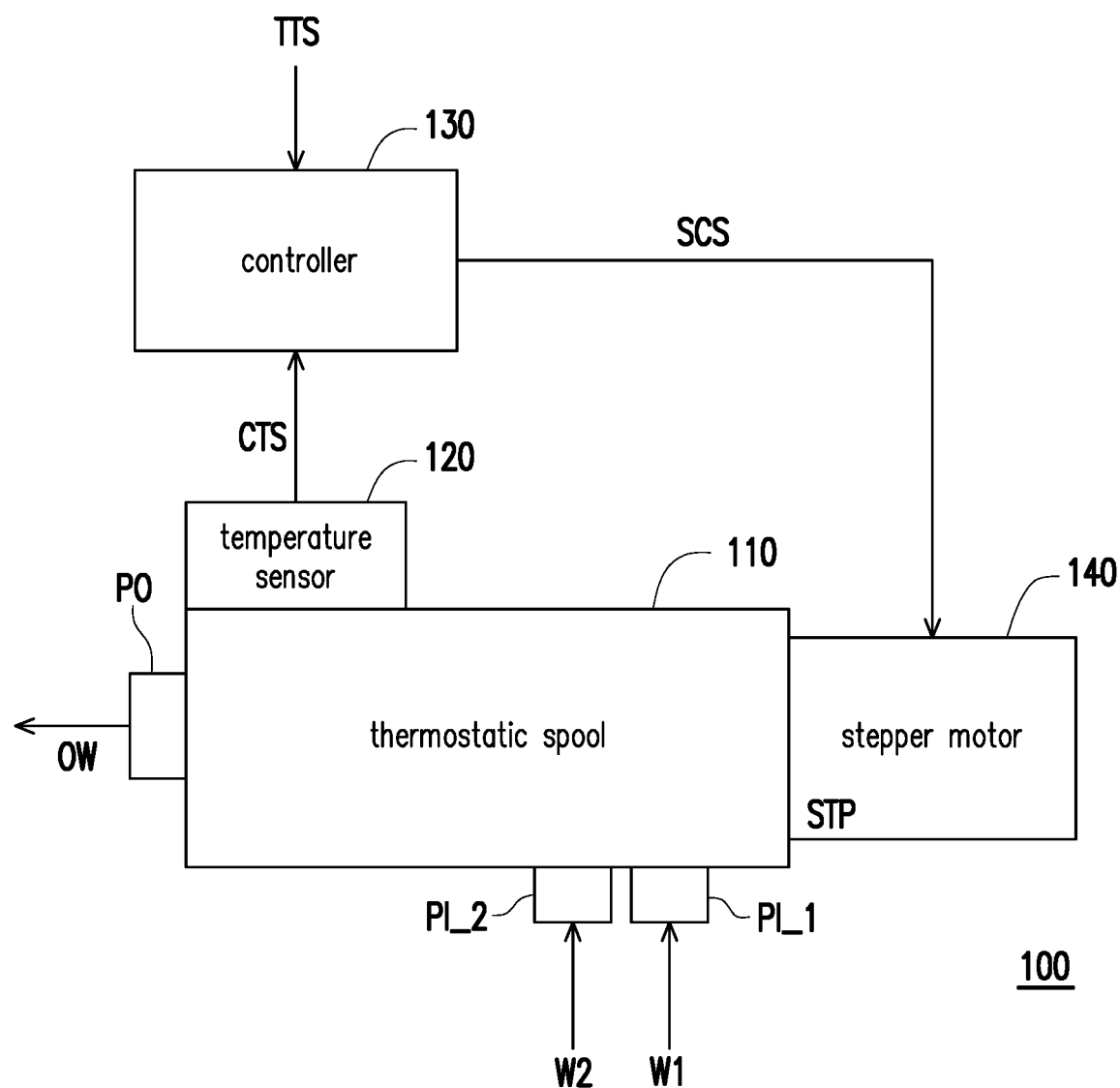
FIG. 1 is a schematic view of a water temperature control system according to an embodiment of the invention.

Please refer to FIG. 1. FIG. 1 is a schematic view of a water temperature control system according to an embodiment of the invention. In the present embodiment, a water temperature control system 100 includes a thermostatic spool 110, a temperature sensor 120, a controller 130, and a stepper motor 140. The thermostatic spool 110 has a first water inlet PI_1, a second water inlet PI_2, and a water outlet PO. The thermostatic spool 110 may receive water W1 at a first temperature through the first water inlet PI_1, receive water W2 at a second temperature through the second water inlet PI_2, and mix the water W1 at the first temperature and the water W2 at the second temperature to produce output water OW. The thermostatic spool 110 provides the output water OW through the water outlet PO. The temperature sensor 120 is disposed at the thermostatic spool 110. Based on a sensing frequency (e.g., once per second or once every two seconds), the temperature sensor 120 senses a water temperature of the output water OW and provides a current water temperature signal CTS according to the water temperature of the output water OW. That is, the temperature sensor 120 provides the current water temperature signal CTS in form of an electric signal according to the water temperature of the output water OW. In the present embodiment, a water temperature of the water W1 at the first temperature can be set as being higher than a water temperature of the water W2 at the second temperature. In some embodiments, the water temperature of the water W1 at the first temperature can be set as being lower than the water temperature of the water W2 at the second temperature.

In the present embodiment, the controller 130 is coupled to the driver 120. The controller 130 is configured to receive a target water temperature signal TTS and a current water temperature signal CTS provided by the temperature sensor 120. The controller 130 provides a step number control signal SCS according to the target water temperature signal TTS and the current water temperature signal CTS. The target water temperature signal TTS is an electric signal associated with the desired water temperature. For instance, the desired water temperature is 45° C., and the target water temperature signal TTS is the electric signal corresponding to 45° C.

In the present embodiment, the stepper motor 140 is disposed at the thermostatic spool 110 and coupled to the controller 130. The stepper motor 140 receives the step number control signal SCS provided by the controller 130. Based on the step frequency greater than the sensing frequency and according to the step number control signal SCS, the stepper motor 140 provides a step number STP, so as to adjust a flow rate of the water W1 at the first temperature and a flow rate of the water W2 at the second temperature. The step number STP provided by the stepper motor 140 can determine the flow rate of the water W1 at the first temperature and the flow rate of the water W2 at the second temperature received by the thermostatic spool 110. For instance, the flow rate that can be received by the thermostatic spool 110 is 100 units (e.g., 100 L/min). When the step number STP is 0, the flow rate of the water W1 at the first temperature is 0 unit, and the flow rate of the water W2 at the second temperature is 100 units. This means that if the step number STP is 0, the thermostatic spool 110 merely receives the water W2 at the second temperature but does not receive the water W1 at the first temperature, and therefore the temperature of the output water OW is substantially equal to the second temperature. For instance, if the step number STP is 110, the flow rate of the water W1 at the first temperature is 100 units, and the flow rate of the water W2 at the second temperature is 0 unit. This means that if the step number STP is 110, the thermostatic spool 110 merely receives the water W1 at the first temperature but does not receive the water W2 at the second temperature, and therefore the temperature of the output water OW is substantially equal to the first temperature. For instance, when the step number STP is 55, the flow rate of the water W1 at the first temperature is 50 units, and the flow rate of the water W2 at the second temperature is 50 units. This indicates that if the step number STP is 55, the thermostatic spool 110 the water W1 at the first temperature and the water W2 at the second temperature, and the water W1 at the first temperature and the water W2 at the second temperature have the same flow rate; hence the temperature of the output water OW is substantially between the first temperature and the second temperature. Hence, the step number STP can be applied to determine that the thermostatic spool 110 receives the flow rate of the water W1 at the first temperature and the flow rate of the water W2 at the second temperature.

It is worth mentioning that the water temperature control system 100 senses the water temperature of the output water OW based on the sensing frequency to provide the current water temperature signal CTS and provides the step number control signal according to the target water temperature signal TTS and the current water temperature signal CTS. Next, in the invention, the step number STP corresponding to the step number control signal is provided by the stepper motor 140 based on the step frequency and according to the step number control signal, so as to adjust the flow rate of the water W1 at the first temperature and the flow rate of the water W2 at the second temperature. The step frequency is greater than the sensing frequency. As such, the thermostatic spool 110 can quickly and instantly reach the water temperature desired by the users according to the flow rate of the water W1 at the first temperature and the flow rate of the water W2 at the second temperature associated with the step number STP.

Figure 2:
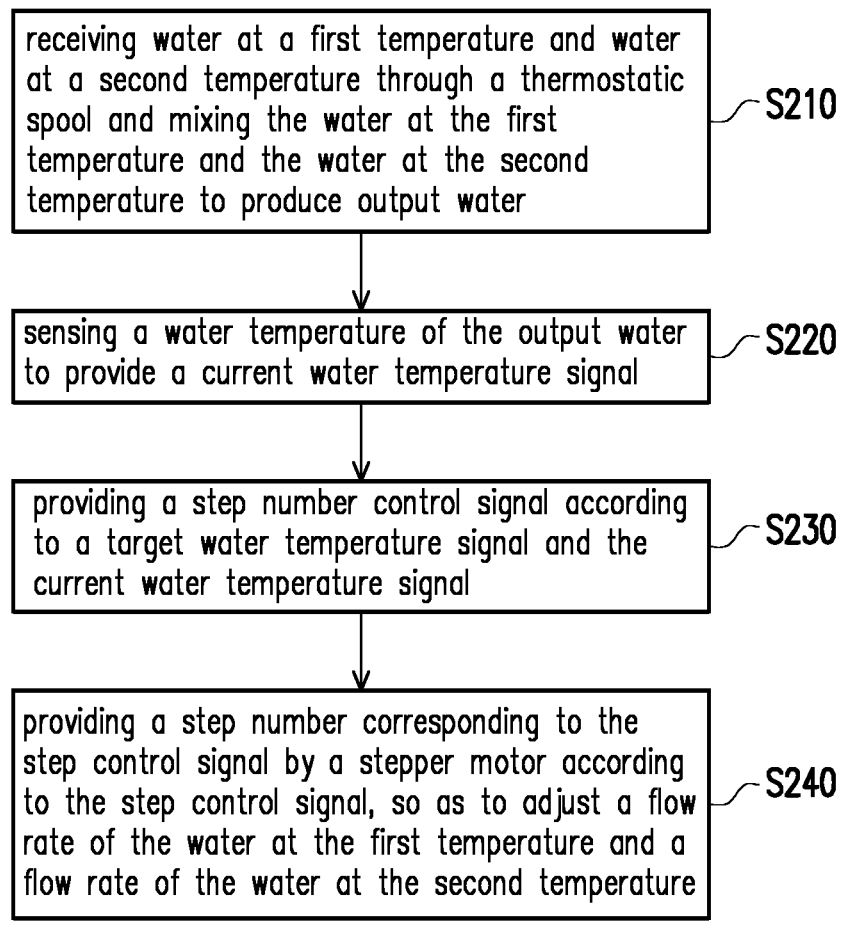
FIG. 2 is a flowchart of a water temperature control method according to an embodiment of invention.

Please refer to FIG. 1 and FIG. 2. FIG. 2 is a flowchart of a water temperature control method according to an embodiment of invention. In step S210, the water temperature control system 100 receives the water W1 at the first temperature and the water W2 at the second temperature through the thermostatic spool 110 and mixes the water W1 at the first temperature and the water W2 at the second temperature to produce the output water OW. After the output water OW is produced, the water temperature control system 100 in step S220 senses the water temperature of the output water OW, so as to provide the current water temperature signal CTS. In the present embodiment, the water temperature control system 100 may sense the water temperature of the output water OW through the temperature sensor 120, so as to provide the current water temperature signal CTS. The temperature sensor 120 may, based on the sensing frequency, sense the water temperature of the output water OW and provide the current water temperature signal CTS according to the current water temperature of the output water OW.

In step S230, the water temperature control system 100 provides the step number control signal SCS according to the target water temperature signal TTS and the current water temperature signal CTS. In the present embodiment, the water temperature control system 100 may receive the target water temperature signal TTS and the current water temperature signal CTS through the controller 130 and provide the step number control signal SCS according to the target water temperature signal TTS and the current water temperature signal CTS. In step S240, the water temperature control system 100 provides the step number STP corresponding to the step control signal SCS by the stepper motor 140 according to the step control signal SCS, so as to adjust the flow rate of the water W1 at the first temperature and the flow rate of the water W2 at the second temperature.

Figure 3:
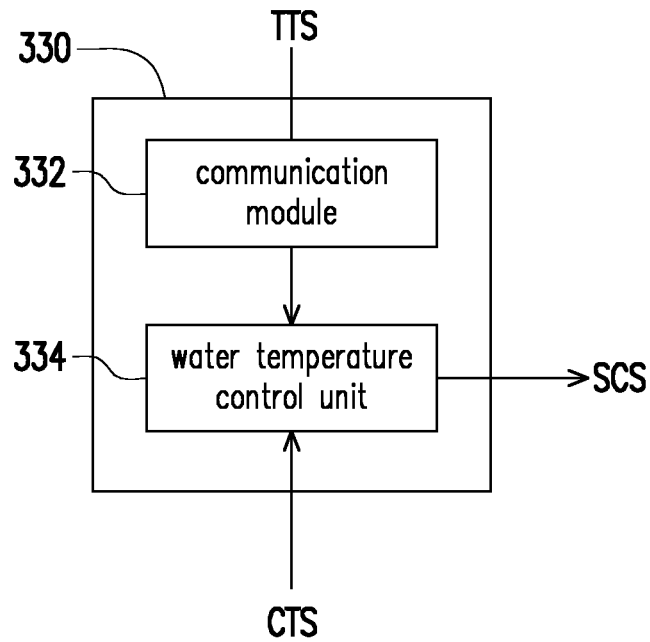
FIG. 3 is a schematic view of a controller according to an embodiment of the invention.

The implementation details of the steps S230 and S240 are further explained below. Please refer to FIG. 2 and FIG. 3. FIG. 3 is a schematic view of a controller according to another embodiment of the invention. In the present embodiment, the controller 330 includes a communication module 332 and a water temperature control unit 334. The communication module 332 receives the target water temperature signal TTS. The communication module 332 can receive the external target water temperature signal TTS through cable transmission or a wireless transmission. The communication module 332 may be a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system, a wireless fidelity (Wi-Fi) system, or a Bluetooth signal transmission device; alternatively, the communication module 332 may be a wireless connection interface including a universal serial bus (USB), firewire (IEEE1394), Ethernet, a universal asynchronous receiver/transmitter (UART), a serial peripheral interface (SPI) bus, and so on, so as to connect external devices.

In the present embodiment, the water temperature control unit 334 is coupled to the communication module 332 and a temperature sensor (e.g., the temperature sensor 120 as shown in FIG. 1). The water temperature control unit 334 in step S230 provides the step number control signal according to the target water temperature signal TTS and the current water temperature signal CTS. The water temperature unit 334 is, for instance, a central processing unit (CPU) or any other programmable general-purpose or special-purpose microprocessor, digital signal processor (DSP), programmable controller, application specific integrated circuit (ASIC), programmable logic device (PLD), any other similar device, or a combination of said devices where computer programs can be loaded and executed.

Detailed descriptions are provided hereinafter. In some embodiments, the water temperature of the water at the first temperature remains constantly at T_W1 (e.g., 20° C.), the water temperature of the water at the second temperature remains constantly at T_W2 (e.g., 60° C.), given that the flow rate received by the thermostatic spool is fixed. Hence, the water temperature control unit 334 can provide the step number control signal SCS configured to indicate the step number of the stepper motor (e.g., the stepper motor 140 as shown in FIG. 1) according to equation (1), equation (2), and equation (3).

$$X+Y=1 \quad \text{equation (1)}$$

$$T\_W1 \times X + T\_W2 \times Y = T\_OW \quad \text{equation (2)}$$

$$N\_step = X \times m\_step \quad \text{equation (3)}$$

Here, X is a proportion accounted for by the flow rate of the water at the first temperature, Y a proportion accounted for by the flow rate of the water at the second temperature, TT is the water temperature of the output water, N_step is the step number of the stepper motor, and m_step is the maximum step number of the stepper motor.

In light of the foregoing, if the maximum step number of the stepper motor is 110, and if the step number is 0, the proportion accounted for by the flow rate of the water at the first temperature is 0. The temperature of the output water is set at 35° C., and according to the equation (1) and the equation (2) it can be learned that the proportion accounted for by the flow rate of the water at the first temperature is 62.5%, and the proportion accounted for by the flow rate of the water at the second temperature is 37.5%. According to the equation (3), given that the temperature of the output water is 35° C., the step number of the stepper motor is 69. The water temperature control unit 334 can provide the step number control signal SCS configured to indicate that the step number of the stepper motor is 69. Accordingly, the water temperature control unit 334 can learn the current step number of the stepper motor according to the current water temperature signal CTS of the current output water. The water temperature control unit 334 can also obtain the target step number of the stepper motor according to the target water temperature signal TTS.

In light of the foregoing, if the current water temperature of the output water is 35° C., the water temperature control unit 334 receives the current water temperature signal CTS corresponding to 35° C. The water temperature control unit 334 receives the target water temperature signal TTS corresponding to the target water temperature at 45° C., and the water temperature control unit 334 provides the step number control signal SCS configured to indicate that the step number of the stepper motor is 41 according to the equation (1), the equation (2), and the equation (3). As such, the stepper motor in step S240 adjusts the step number from 69 to 41 according to the step number control signal SCS, so as to adjust the flow rate of the water at the first temperature and the flow rate of the water at the second temperature, whereby the water temperature of the output water is adjusted to the target water temperature (45° C.).

In some embodiments, the water temperature control unit 334 further includes a register (not shown) configured to record the current step number of the stepper motor. As such, it is not necessary for the water temperature control unit 334 in step S230 to re-obtain the current step number of the stepper motor according to the equation (1), the equation (2), and the equation (3); instead, the current step number of the stepper motor can be obtained from the register.

In some embodiments, the water temperature control unit 334 in step S230 further determines whether a difference between the target water temperature and the current water temperature is greater than a threshold value according to the target water temperature signal TTS and the current water temperature signal CTS. If the difference is determined to be greater than the threshold value (e.g., 1° C.), the water temperature control unit 334 provides the step number control signal SCS. On the other hand, if the difference is determined to be less than or equal to the threshold value, the water temperature control unit 334 does not provide the step number control signal SCS.

It is worth mentioning that when the water temperature control unit 334 determines the variations between the target water temperature and the current water temperature is less than or equal to the threshold value, the water temperature control unit 334 does not provide the step number control signal SCS. Hence, the stepper motor does not step back and forth due to the minor change in the target water temperature and the current water temperature. As such, the stepper motor provided in the invention can be protected from being damaged due to the overheating issue caused by stepping back and forth.

Figure 4:
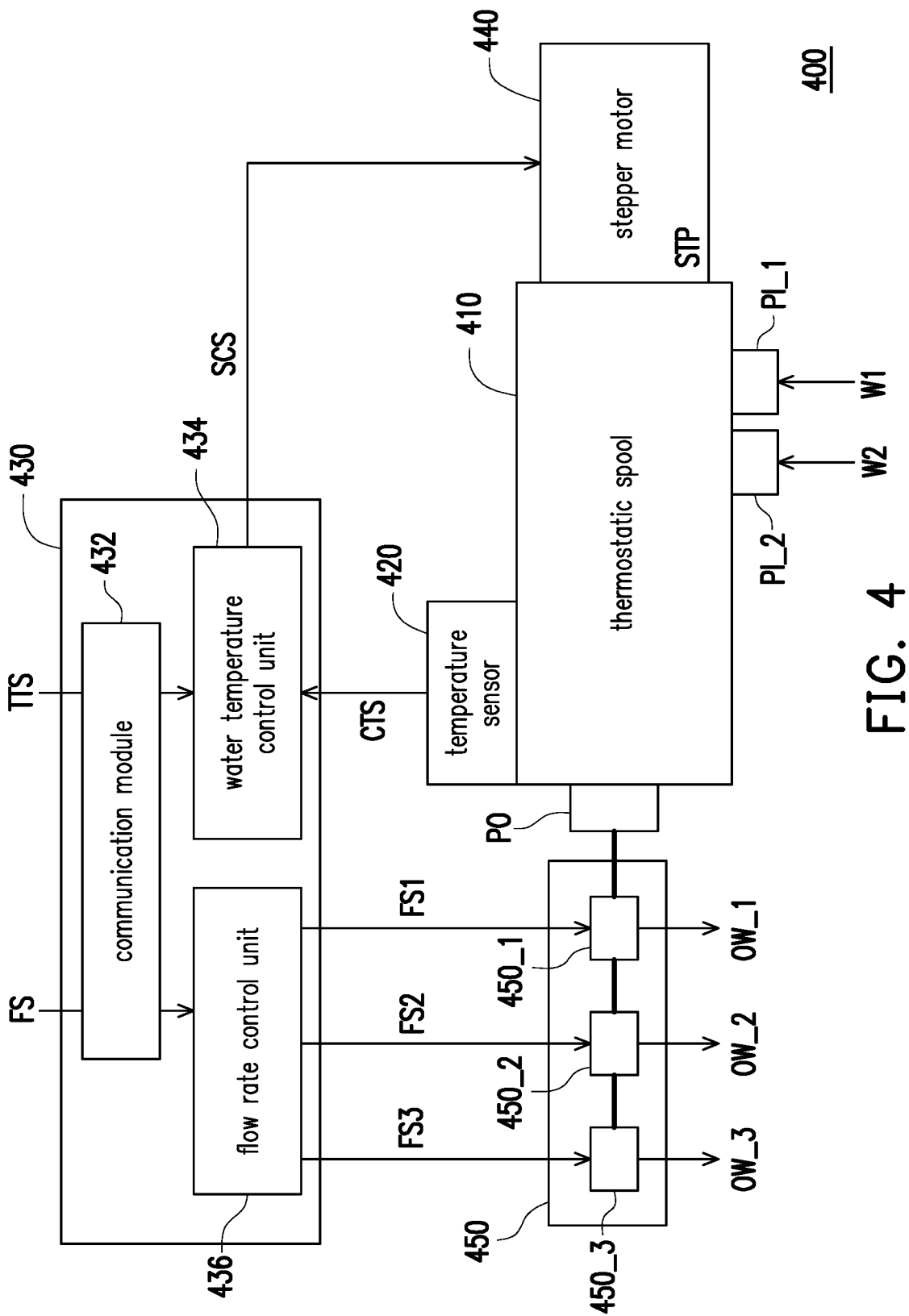
FIG. 4 is a schematic view of a water temperature control system according to another embodiment of the invention.

Please refer to FIG. 4. FIG. 4 is a schematic view of a water temperature control system according to another embodiment of the invention. In the present embodiment, the water temperature control system 400 includes a thermostatic spool 410, a temperature sensor 420, a controller 430, a stepper motor 440, and a water valve 450. The implementation details of the thermostatic spool 410, the temperature sensor 420, the water temperature control unit 434 of the controller 430, and the stepper motor 440 are sufficiently taught in the embodiments depicted in FIG. 1 to FIG. 3 and thus will not be described again. In the present embodiment, compared to the controller 330 depicted in FIG. 3, the controller 430 not only includes the communication module 432 and the water temperature control unit 434 but also includes a flow rate control unit 436. The flow rate control unit 436 is coupled to the communication module 432. The flow rate control unit 436 receives a flow rate signal FS through the communication module 432 and provides flow rate control signals FS1-FS3 according to the flow rate signal FS. A water valve 450 of the water temperature control system 400 is coupled to the water outlet PO and the flow rate control unit. The flow rate control unit 436 is, for instance, a CPU or any other programmable general-purpose or special-purpose microprocessor, DSP, programmable controller, ASIC, PLD, any other similar device, or a combination of said devices where computer programs can be loaded and executed.

The water valve 450 receives the output power provided by the thermostatic spool 410 through the water outlet PO and adjust the flow rate of the output water according to the flow rate control signal provided by the flow rate control unit 436. In the present embodiment, the water valve 450 may include a first sub-water valve 450_1, a second sub-water valve 450_2, and a third sub-water valve 450_3. The first sub-water valve 450_1 may be turned on or off according to the flow rate control signal FS1. The second sub-water valve 450_2 may be turned on or off according to the flow rate control signal FS2. The third sub-water valve 450_3 may be turned on or off according to the flow rate control signal FS3.

In some embodiments, the flow rate of the output water OW_1 output by the first sub-water valve 450_1 when it is being turned on, the flow rate of the output water OW_2 output by the second sub-water valve 450_2 when it is being turned on, and the flow rate of the output water OW_3 output by the third sub-water valve 450_3 when it is being turned on are the same. Hence, the water valve 450 may output four kinds of flow rates of the output power (including the flow rates of the output water output by the first sub-water valve 450_1, the second sub-water valve 450_2, and the third sub-water valve 450_3 when they are being turned off) according to the flow rate control signals FS1-FS3. In some embodiments, the flow rate of the output water OW_1 output by the first sub-water valve 450_1 when it is being turned on, the flow rate of the output water OW_2 output by the second sub-water valve 450_2 when it is being turned on, and the flow rate of the output water OW_3 output by the third sub-water valve 450_3 when it is being turned on are different from each other. For instance, the flow rate of the output water OW_3 output by the third sub-water valve 450_3 when it is being turned on is twice the flow rate of the output water OW_2 output by the second sub-water valve 450_2 when it is being turned on. The flow rate of the output water OW_2 output by the second sub-water valve 450_2 when it is being turned on is twice the flow rate of the output water OW_1 output by the first sub-water valve 450_1 when it is being turned on. Accordingly, the water valve 450 can output eight kinds of flow rates of the output water (including the flow rates of the output water output by the first sub-water valve 450_1, the second sub-water valve 450_2, and the third sub-water valve 450_3 when they are being turned off) according to the flow rate control signals FS1-FS3. In the invention, the number of water valves and the number of flow rate control signals may be one or plural. The number of water valves and the number of flow rate control signals are not limited to those provided in the present embodiment.

To sum up, according to the invention, the current water temperature of the output water is sensed based on the sensing frequency to provide the current water temperature signal, and the step number control signal is provided according to the target water temperature signal and the current water temperature signal. Next, in the invention, the step number corresponding to the step number control signal is provided by the stepper motor based on the step frequency greater than the sensing frequency and according to the step number control signal, so as to adjust the flow rate of the water at the first temperature and the flow rate of the water at the second temperature. As such, the thermostatic spool can quickly and instantly reach the water temperature desired by the users according to the flow rate of the water at the first temperature and the flow rate of the water at the second temperature associated with the step number. Besides, when the water temperature control unit determines that the variations between the target water temperature and the current water temperature is less than or equal to the threshold value, the water temperature control unit does not provide the step number control signal. Hence, the stepper motor does not step back and forth due to the minor change in the target water temperature and the current water temperature. As such, the stepper motor provided in the invention can be protected from being damaged due to the overheating issue caused by stepping back and forth.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:
1. A water temperature control system comprising:
   a thermostatic spool having a first water inlet, a second water inlet, and a water outlet, receiving water at a first temperature through the first water inlet, receiving water at a second temperature through the second water inlet, mixing the water at the first temperature and the water at the second temperature to produce output water, and providing the output water through the water outlet;
   a temperature sensor disposed at the thermostatic spool and sensing a water temperature of the output water based on a sensing frequency to provide a current water temperature signal;
   a controller coupled to the temperature sensor, receiving a target water temperature signal and the current water temperature signal, and providing a step number control signal according to the target water temperature signal and the current water temperature signal; and
   a stepper motor disposed at the thermostatic spool and coupled to the controller, providing a step number based on a step frequency and according to the step number control signal, so as to adjust a flow rate of the water at the first temperature and a flow rate of the water at the second temperature, wherein the step frequency is greater than the sensing frequency.
2. The water temperature control system according to claim 1, wherein the controller comprises:
   a communication module receiving the target water temperature signal; and a water temperature control unit coupled to the communication module and the temperature sensor and providing the step number control signal according to the target water temperature signal and the current water temperature signal.

3. The water temperature control system according to claim 2, wherein the water temperature control unit further:
   obtains a current step number of the stepper motor associated with the current water temperature signal,
   obtains a target step number of the stepper motor according to the target water temperature signal, and
   provides the step number control signal according to the target step number of the stepper motor and the current step number of the stepper motor.

4. The water temperature control system according to claim 2, wherein the water temperature control unit further:
   determines whether a difference between a target water temperature and a current water temperature is greater than a threshold value according to the target water temperature signal and the current water temperature signal,
   provides the step number control signal when the difference is greater than the threshold value, and
   provides no step number control signal when the difference is less than or equal to the threshold value.

5. The water temperature control system according to claim 2, wherein the controller comprises:
   a flow rate control unit coupled to the communication module, receiving a flow rate signal through the communication module, and providing a flow rate control signal according to the flow rate signal, wherein the water temperature control system adjusts a flow rate of the output water according to the flow rate control signal.

6. The water temperature control system according to claim 5, further comprising:
   a water valve coupled to the water outlet and the flow rate control unit, receiving the output water through the water outlet, and adjusting the flow rate of the output water according to the flow rate control signal provided by the flow rate control unit.

7. A water temperature control method adapted to a water temperature control system, the water temperature control system comprising a thermostatic spool and a stepper motor, wherein the stepper motor is disposed at the thermostatic spool, the water temperature control method comprising:
   receiving water at a first temperature and water at a second temperature through the thermostatic spool and mixing the water at the first temperature and the water at the second temperature to produce output water;
   sensing a water temperature of the output water based on a sensing frequency to provide a current water temperature signal;
   receiving a target water temperature signal and receiving the current water temperature signal and providing a step number control signal according to the target water temperature signal and the current water temperature signal; and
   providing a step number corresponding to the step number control signal by the stepper motor based on a step frequency and according to the step number control signal, so as to adjust a flow rate of the water at the first temperature and a flow rate of the water at the second temperature,
   wherein the step frequency is greater than the sensing frequency.

8. The water temperature control method according to claim 7, wherein the step of providing the step number control signal according to the target water temperature signal and the current water temperature signal comprises:
   obtaining a current step number of the stepper motor associated with the current water temperature signal;
   obtaining a target step number of the stepper motor according to the target water temperature signal; and
   providing the step number control signal according to the target step number of the stepper motor and the current step number of the stepper motor.

9. The water temperature control method according to claim 7, further comprising:
   determining whether a difference between a target water temperature and a current water temperature is greater than a threshold value according to the target water temperature signal and the current water temperature signal;
   providing the step number control signal when the difference is greater than the threshold value; and
   providing no step number control signal when the difference is less than or equal to the threshold value.

10. The water temperature control method according to claim 7, further comprising:
   receiving a flow rate signal and providing a flow rate control signal according to the flow rate signal; and
   adjusting a flow rate of the output water according to the flow rate control signal.

* * * * *